United States Patent [19]

Hubbard

[11] 4,199,091
[45] Apr. 22, 1980

[54] DOCUMENT TRACTOR

[75] Inventor: Leo J. Hubbard, Somerset, Mass.

[73] Assignee: Precision Handling Devices, Inc., Assonet, Mass.

[21] Appl. No.: 52,519

[22] Filed: Jun. 27, 1979

[51] Int. Cl.² .............................................. G03B 1/30
[52] U.S. Cl. ...................................... 226/74; 226/170
[58] Field of Search .................... 226/74, 75, 170–172

[56] References Cited

U.S. PATENT DOCUMENTS

| | | | |
|---|---|---|---|
| 3,825,162 | 7/1974 | Hubbard | 226/74 |
| 4,129,239 | 12/1978 | Hubbard | 226/74 |

*Primary Examiner*—Leonard D. Christian
*Attorney, Agent, or Firm*—Martin LuKacher

[57] ABSTRACT

In order to removably yet reliably assemble the frame parts, endless belt and sprocket of a document tractor, holes are provided in the hub of one of the frame parts which provide a guide platform for the endless belt which has pins engageable with perforations on the document to be metered. Flexible rods in registry with these holes extend from the other frame part. Latches on the outer ends of these rods engage the outsides of the holes when the rods move into latching engagement as the frame parts are brought together. The tractor may be disassembled by manually deflecting the rods to release the latches.

6 Claims, 5 Drawing Figures

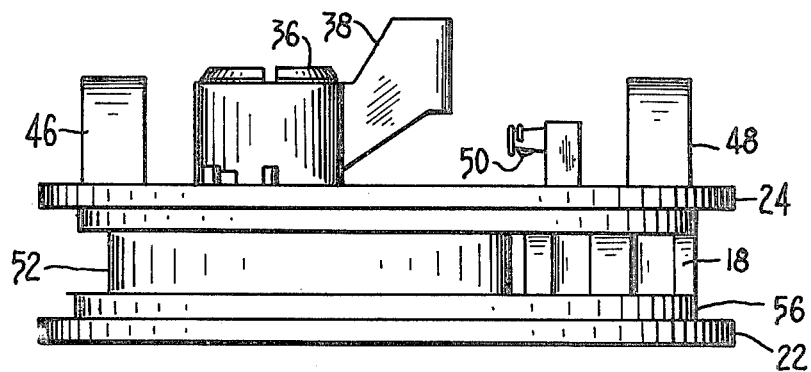
FIG. 2
FIG. 3
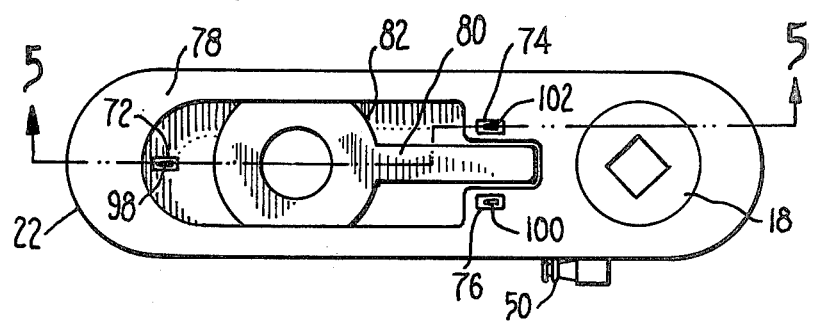
FIG. 4
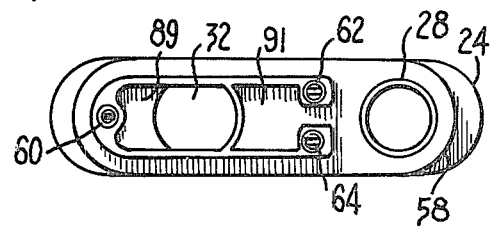
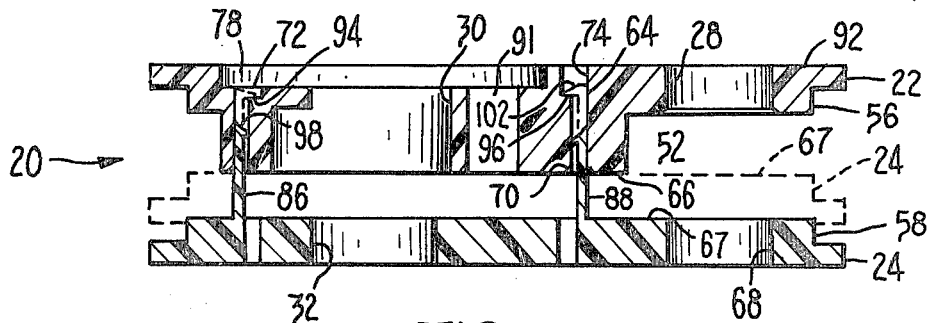
FIG. 5

DOCUMENT TRACTOR

The present invention relates to document tractors and particularly to improved mechanisms providing rapid and low cost assembly of document tractors during manufacture and disassembly for repair, which mechanism makes nuts, bolts, screws, weldments and other like fastening for document tractor assembly unnecessary.

Document tractors with which the invention is especially suitable for use have endless belts carrying pins which engage perforations in perforated documents such as used in computer peripheral equipment such as printers, teletypewriters, and the like. Tractors of the type wherein the invention may find applications are described in U.S. Pat. Nos. 3,825,162 issued July 23, 1974, and 4,129,239 issued Dec. 12, 1978, to Leo J. Hubbard.

Document tractors, including those described in the above referenced patents, use separate fasteners such as nuts and bolts and screws to assemble them together. In some tractors the parts are welded together. The use of screws, nuts and bolts increases the cost of the tractor because of the labor involved in handling them and their additional parts cost. Under some operating conditions, especially vibrations, screws and nuts and bolts can work loose causing improper and unreliable tractor performance. Weldments entail additional labor cost in tractor manufacture and make it difficult or impossible to disassemble the tractor for repair without destroying it.

It is therefore an object of the present invention to provide an improved document tractor.

It is a further object of the invention to provide an improved document tractor in which separate fasteners such as screws, nuts and bolts, need not be used for assembling the same.

It is a still further object of the present invention to provide an improved document tractor having better reliability than the tractors assembled with nuts and bolts or screws which may be subject to loosening and working apart in operation, especially under vibration.

It is an object of the present invention to provide an improved document tractor of construction which eliminates the need for removable assembly hardware such as screws, nuts and bolts and which nevertheless can be disassembled for repair or maintenance.

It is a still further object of the present invention to provide an improved document tractor of such construction that it can be assembled at low cost.

Briefly described, the invention is embodied in a document tractor having an endless belt carrying drive elements engageable with perforations in the document and also having a sprocket which engages the belt to drive the belt. A frame made of molded plastic is part of the tractor assembly. This frame has a pair of plates which are disposed in side-by-side relationship. Aligned holes extending laterally through the plates enable the sprocket to be held journaled between the plates. A first of these plates has a hub which extends between the plates. The hub is located adjacent to the sprocket and defines a guide platform for the endless belt which is entrained around the hub and the sprocket. The mechanism for removably fastening the plates to each other also assembles the tractor. This mechanism is made up of openings through the hub which extend between the plates from the inside of the hub which abuts the inside of the adjacent plate through to the outside of the hub. The adjacent plate has flexible rods integrally molded as part thereof. These rods are in registry with the openings of the holes which are on the inside when the tractor is assembled and extend through to the outside of the hub. Latches such as hooks are formed on the outer ends of the rods. These latches are in interfering relationship with the holes along one side of the holes. When the plates are brought into abutment, the hooks ends cause the rods to deflect and when the hooks clear the outside of the holes the hooks snap over the rim of the opening on the outside of the holes to engage the latches with the outside of the holes. This attaches the plates together in a removable manner. By deflecting the rods, the hooks are cleared from the outside of the holes and the tractor may be disassembled.

The foregoing and other objects, features and advantages of the invention as well as the presently preferred embodiment thereof will be more apparent from a reading of the following description in connection with the accompanying drawings in which:

FIG. 2 is a top view of the document tractor shown in FIG. 1, with the hinged guide plate removed and the endless belt removed;

FIG. 3 is a plan view of the document tractor, the view taken from the bottom of the tractor as shown in FIG. 2;

FIG. 4 is a view from the inside of the plate of the frame which has the hub; and FIG. 5 is a simplified sectional view of the tractor in process of being assembled, the view being taken generally along the line 4—4 of FIG. 3 and showing only the plates of the frame with the other parts removed.

Figure 1:
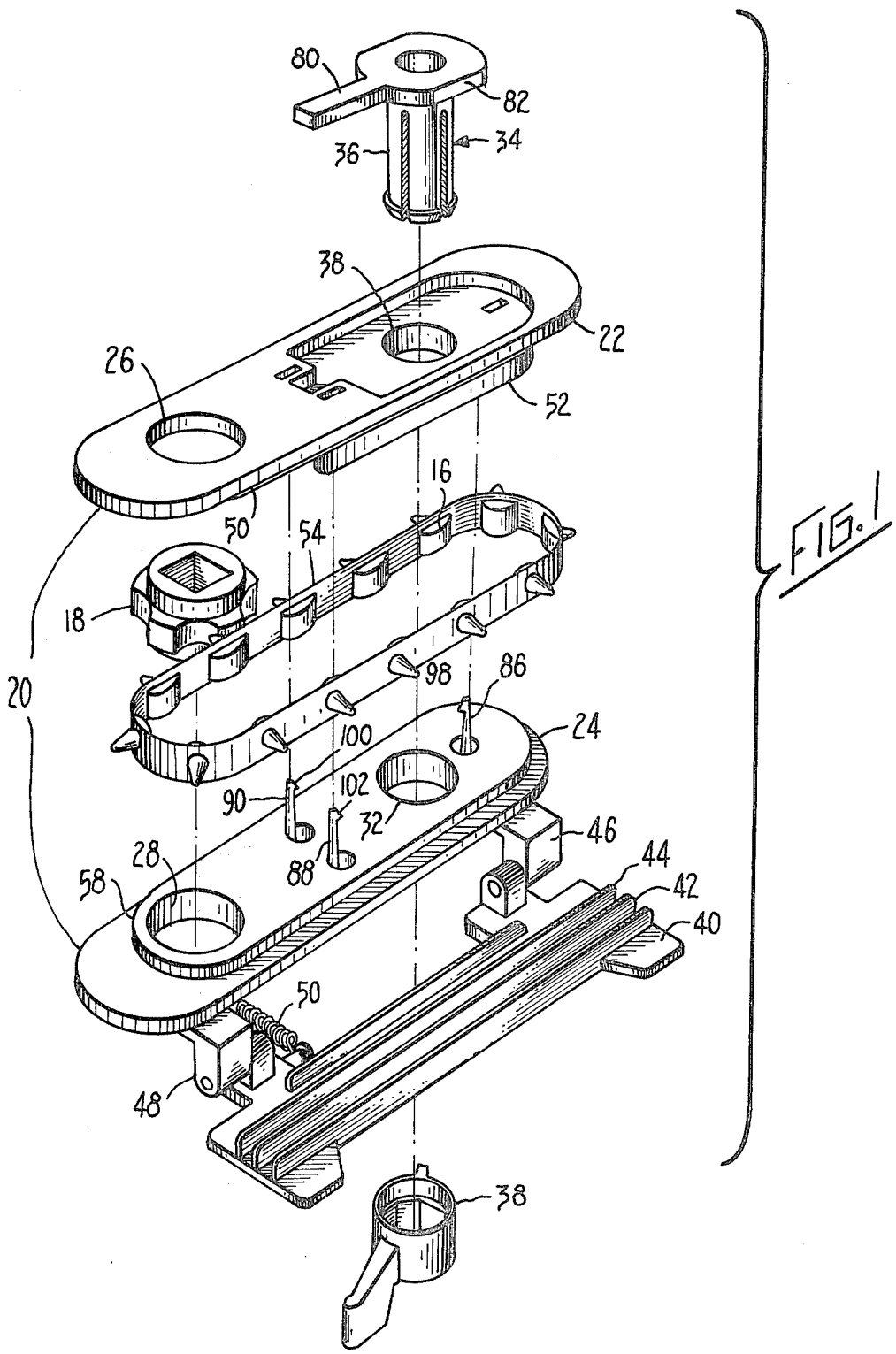
FIG. 1 is an exploded view of a document tractor embodying the invention.

Referring more particularly to the drawings, the document tractor is made up of endless belt 10 having drive elements 12 consisting of pins 14 and rollers 16 on opposite sides of the belt. The pins 12 engage perforations in the document. The construction of the belt is described in Hubbard U.S. Pat. No. 3,825,162 referenced above. A sprocket 18 is located inside the belt when the tractor is assembled and engages the rollers 16 to drive the belt. The tractor has a frame 20 made up of plates 22 and 24. These plates have holes 26 and 28 in which the sprocket is journaled. The plates 22 and 24 also have holes 30 and 32 in which is located a collet clamp 34 which is made up of a split sleeve 36 and rotatable ring 38. The sleeve 36 passes through the holes 30 and 32 and provides a bushing for a shaft on to which the tractor is clamped by rotating the ring 38. The tractor is mounted between this shaft and a square drive shaft which passes through the sprocket 18.

Reference may be had to Hubbard U.S. Pat. No. 4,129,239 for further description of the collet clamp and the support for the tractor.

A guide plate 40, which has a longitudinal aperture between the ribs 42 and 44 thereon which passes the pins 12 as the belt travels, is mounted on hinges 46 and 48. The guide plate 40 is shown in open position in FIG. 1. When it is pivoted in an upward direction as shown in FIG. 1, a spring 50 which is attached between the plate 24 and the guide plate 40 causes the plate to snap over and be held down on the top of the tractor so as to provide a guide for the document which passes between the guide plate and the top of the tractor.

The plate 22 is formed with a hub 52 which provides a platform for the belt. The edges 54 of the belt which overhang the rollers 16 are supported by raised sections 56 and 58 on the insides of the plates 22 and 24 respectively. The hub 52 is also shown in FIGS. 4 and 5 and has three holes 60, 62, and 64. One of these holes 60 is on the outside of the hole 32 and two of the holes 62 and 64 are between the sprocket hole 28 and the hole which carries the collet 34 and the support shaft. These holes extend laterally through the hub 52. One end of the holes is on the inside 66 of the hub which comes into abutting relationship with the plate 24. The entrances to these holes may be tapered as shown at 68 and 70 in FIG. 5. The holes are disposed with their centers at the apexes of a triangle. The holes are also perpendicular to the inside face 66. The outside of the holes or their exits 72, 74 and 76 are recessed. The recess for the hole 60 is provided in part by a recess 78 which forms a keyway for a tang 80 which is part of a flange 82 of the collet clamp 34. This tang and flange prevent the collet clamp from rotating. The keyway may be eliminated and rotation prevention is then afforded by the flange 82 above. By virtue of the recess all of the parts and particularly flexible latching rods 86, 88 and 90 are maintained below the outside surface 92 of the plate 22 to inhibit inadvertent disassembly of the tractor.

The outsides or the exits of the holes 60, 62, and 64, also have shoulders. The shoulder 94 at the exit of the hole 60 is shown and the shoulder 96 at the exit of the hole 64 is also shown. These shoulders are at the same lateral distance from the inside surface 66 of the holes since the rods 86, 88 and 90 are the same length. In the event that the rods are of different length the shoulders may be dispensed with and the rims or edges at the outside of the holes may be used instead.

The frame parts and particularly the plates 22 and 24 including the hub 52 and the sections 56 and 58 as well as the rods 86, 88 and 90, are molded of plastic material such as a glass filled polycarbonate plastic. This material is sold under the Trademark "LEXAN" by the General Electric Company. In order to save plastic material and reduce the weight of the tractor the hub 52 is recessed at 89 and 91 as shown in FIGS. 4 and 5.

The rods 86, 88 and 90 are flexible and are molded with latches in the form of hooks 98, 100 and 102 at the outer ends thereof. It will be seen, especially in FIG. 5, that the inside surface 56 and an inside surface 67 of the plate 24 come into abutment with each other when the frame 20 is assembled. The position of the plates and these surfaces 66 and 70, when they are in abutment, is shown by the dashed lines in FIG. 5. The rods are in registry with the openings 60, 62 and 64 at the insides of the holes 60, 62 and 64. This is where the holes are tapered as shown at 68 and 70 in FIG. 5. The hooks on opposite sides of the hole 32 face toward each other. The tips of the hooks 98, 100 and 102 are in interfering relationship with the same sides of the holes on which the shoulders 96 and 98 are located. These tips cam over the tapered entrances 68 and 70 of the holes as they enter the holes. Accordingly, when the tractor is assembled the rods 88 and 90 bend in one direction (to the left as shown in FIG. 5), while the rod 86 bends in the opposite direction (to the right as shown in FIG. 5) to move the hooks 98, 100 and 102 over the shoulders at the outside ends of the holes. The hooks snap over the shoulders as shown in dashed lines in FIG. 5. The tractor is then assembled with the sprocket and endless belt in operating position between the plates 22 and 24.

To disassemble the tractor, the hooks are manually deflected in the direction opposite to which they bend during assembly to clear the shoulders. Then the plates 22 and 24 may be pulled apart. The tractor can now be repaired if necessary. Since the entire assembly is molded and no screws, nuts, bolts, or weldments are necessary, the tractor may readily be manufactured at low cost.

From the foregoing description it will be apparent that there has been provided an improved document tractor having an improved mechanism whereby the tractor may be assembled. The mechanism reduces the cost of the tractor and provides additional advantages of reliability and repairability. Variations and modifications of the hereindescribed embodiment of the invention will undoubtedly suggest themselves to those skilled in the art. Accordingly, the foregoing description should be taken merely as illustrative and not in any limiting sense.

What is claimed is:

1. In a document tractor having an endless belt carrying drive elements engageable with perforations in the document, a sprocket also engageable with the belt, a frame made of molded plastic having a pair of plates disposed in side-by-side relationship and having aligned holes in which said sprocket is journaled, a first of said pair of plates having a hub extending from the side thereof facing a second of said pair of plates and adjacent to said sprocket to define a guide platform for said belt, said belt being entrained around said hub and said sprocket, a mechanism for removably fastening said plates to each other to assemble said tractor, which comprises openings through said hub extending between said plates and from the inside of said hub which abuts the inside of said second plate to the outside of said hub, flexible rods integrally molded as part of said second plate in registry with said holes at the inside of said hubs and in interfering relationship with said holes along one side thereof near the outside of said holes, latches formed on the outer ends of said rods facing the sides of said holes which are in interfering relationship with said rods when said hub is brought into abutment with said second plate to deflect said rod to engage said latches with the outside of said holes to attach said plates whereby said plates are removable upon manual deflection of said rods at the outsides of said holes.

2. The invention as set forth in claim 1 wherein the outside of said first plate is recessed at least around the outside of said holes to define shoulders which said latches engage when received into said holes, said rods being of such length that the outside ends thereof are disposed within said recesses below the outside of said first plate.

3. The invention as set forth in claim 1 whererin said plates have another hole spaced along said plates from said sprocket hole, said rods being disposed on opposite sides of said other hole with at least one of said rods between said sprocket hole and said other hole.

4. The invention as set forth in claim 3 wherein said latches are hooks on the outer ends of said rods, said hooks on those of said rods on opposite sides of said other hole facing each other.

5. The invention as set forth in claim 4 wherein said rods are three in number and arranged at the apexes of a triangle.

6. The invention as set forth in claim 4 wherein said rods are molded to be inclined away from each other in a direction opposite to the direction in which the hooks thereon face.

* * * * *